United States Patent
Woehner et al.

(10) Patent No.: US 11,208,745 B2
(45) Date of Patent: Dec. 28, 2021

(54) METHOD FOR PRODUCING THIN CARBON FIBER NONWOVENS BY A HORIZONTAL SPLITTING PROCESS

(71) Applicant: SGL CARBON SE, Wiesbaden (DE)

(72) Inventors: Stefan Woehner, Meitingen (DE); Dirk Schneider, Meitingen (DE); Michael Steinroetter, Meitingen (DE)

(73) Assignee: SGL Carbon SE, Wiesbaden (DE)

( * ) Notice: Subject to any disclaimer, the term of this patent is extended or adjusted under 35 U.S.C. 154(b) by 159 days.

(21) Appl. No.: 15/859,879

(22) Filed: Jan. 2, 2018

(65) Prior Publication Data

US 2018/0127906 A1 May 10, 2018

Related U.S. Application Data

(63) Continuation of application No. PCT/EP2016/065099, filed on Jun. 29, 2016.

(30) Foreign Application Priority Data

Jul. 2, 2015 (DE) ...................... 10 2015 212 417.7

(51) Int. Cl.
| | |
|---|---|
| *D04H 1/4242* | (2012.01) |
| *D06H 7/00* | (2006.01) |
| *D04H 1/70* | (2012.01) |
| *B26D 3/28* | (2006.01) |
| *B26D 3/30* | (2006.01) |
| *B26D 1/02* | (2006.01) |
| *H01M 4/86* | (2006.01) |
| *H01M 4/96* | (2006.01) |

(52) U.S. Cl.
CPC .......... *D04H 1/4242* (2013.01); *B26D 1/025* (2013.01); *B26D 3/28* (2013.01); *B26D 3/30* (2013.01); *D04H 1/70* (2013.01); *D06H 7/00* (2013.01); *H01M 4/8657* (2013.01); *H01M 4/96* (2013.01)

(58) Field of Classification Search
None
See application file for complete search history.

(56) References Cited

U.S. PATENT DOCUMENTS

| | | | | |
|---|---|---|---|---|
| 1,161,320 | A | 11/1915 | Loguin | |
| 3,437,539 | A * | 4/1969 | Mesek | D04H 1/425 156/254 |
| 5,057,173 | A | 10/1991 | Bihy et al. | |
| 5,678,369 | A * | 10/1997 | Ishikawa | E04B 1/942 52/309.9 |
| 6,269,724 | B1 | 8/2001 | Sabatelli et al. | |
| (Continued) | | | | |

FOREIGN PATENT DOCUMENTS

| | | |
|---|---|---|
| DE | 1872891 U | 5/1963 |
| DE | 2547958 A1 | 5/1977 |
| (Continued) | | |

*Primary Examiner* — Maria Laios
(74) *Attorney, Agent, or Firm* — Laurence A. Greenberg; Werner H. Stemer; Ralph E. Locher

(57) ABSTRACT

A method for horizontally splitting rolled-up web material in the sample thickness. A carbon fiber nonwoven is moved in relation to a knife structure in order to split off a layer or successively several layers from a roll web. The one layer or several layers are continuously removed in the form of a roll from the carbon fiber nonwoven after the splitting process.

6 Claims, 1 Drawing Sheet

(56) References Cited

U.S. PATENT DOCUMENTS

| | | | |
|---|---|---|---|
| 10,038,181 B2* | 7/2018 | Schweiss | D21H 13/50 |
| 10,305,117 B2* | 5/2019 | Kajiwara | D04H 1/4242 |
| 2002/0074916 A1* | 6/2002 | Wenning | B32B 27/34 |
| | | | 312/406 |
| 2005/0284065 A1* | 12/2005 | Shaffer | E04B 1/88 |
| | | | 52/404.1 |
| 2006/0008616 A1* | 1/2006 | Dean | B31D 3/0292 |
| | | | 428/117 |
| 2007/0264465 A1 | 11/2007 | Klose | |
| 2008/0246379 A1* | 10/2008 | Choudhary | F24C 15/34 |
| | | | 312/400 |
| 2010/0258334 A1* | 10/2010 | Akaike | B60N 2/5685 |
| | | | 174/126.1 |
| 2011/0159767 A1* | 6/2011 | Sakurai | D04H 1/4242 |
| | | | 442/320 |
| 2012/0031389 A1* | 2/2012 | McMaster | F24C 15/04 |
| | | | 126/200 |
| 2012/0060817 A1* | 3/2012 | Wang | F24C 15/34 |
| | | | 126/64 |
| 2012/0152466 A1 | 6/2012 | Homoelle et al. | |
| 2012/0214375 A1* | 8/2012 | Kitano | D01D 5/0038 |
| | | | 442/336 |
| 2012/0247290 A1 | 10/2012 | Leyens et al. | |
| 2014/0205919 A1 | 7/2014 | Wilde et al. | |
| 2015/0318558 A1* | 11/2015 | Kajiwara | H01M 4/8807 |
| | | | 429/534 |
| 2016/0281284 A1* | 9/2016 | Yoshioka | D04H 1/728 |
| 2017/0037564 A1* | 2/2017 | Morrissey | B01D 39/1623 |
| 2018/0301692 A1 | 10/2018 | Schweiss | |
| 2019/0296368 A1* | 9/2019 | Kamai | H01M 8/16 |

FOREIGN PATENT DOCUMENTS

| | | |
|---|---|---|
| DE | 3835007 A1 | 4/1990 |
| DE | 19506370 A1 | 9/1995 |
| DE | 4412432 A1 | 10/1995 |
| DE | 102004047193 A1 | 9/2005 |
| DE | 69828441 T2 | 12/2005 |
| DE | 102010004205 A1 | 7/2011 |
| DE | 102011083118 A1 | 3/2013 |
| DE | 102013217882 A1 | 3/2015 |
| JP | 02014056 A | 1/1990 |
| JP | 2003213555 A | 7/2003 |
| JP | 2005240224 A | 9/2005 |
| JP | 2012131225 A | 7/2012 |
| WO | WO-9105208 A1 * | 4/1991 ............ F24C 15/34 |

* cited by examiner

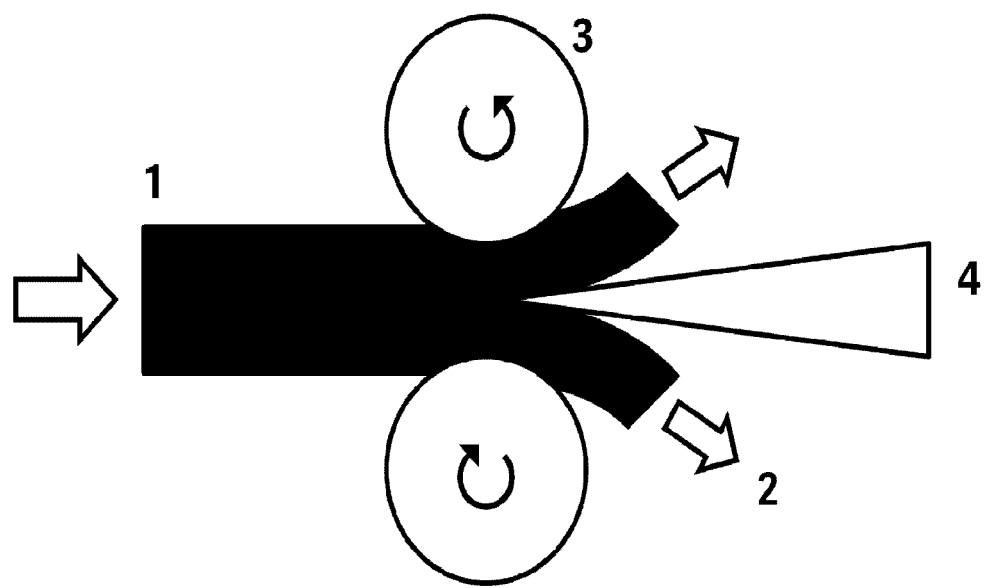

METHOD FOR PRODUCING THIN CARBON FIBER NONWOVENS BY A HORIZONTAL SPLITTING PROCESS

CROSS-REFERENCE TO RELATED APPLICATION

This application is a continuation, under 35 U.S.C. § 120, of copending international application No. PCT/EP2016/065099, filed Jun. 29, 2016, which designated the United States; this application also claims the priority, under 35 U.S.C. § 119, of German patent application No. 10 2015 212 417.7, filed Jul. 2, 2015; the prior applications are herewith incorporated by reference in their entirety.

BACKGROUND OF THE INVENTION

Field of the Invention

The subject matter of the invention is a method for producing a layer made of carbon fiber non-woven fabric by horizontally splitting rolled goods made of carbon fiber non-woven fabric in the sample thickness, and uses of the produced material.

Horizontal means level. Splitting is a production process for dividing a workpiece by means of a cuneiform, or wedge-shaped, tool.

Rolled shapes, or rolled goods, means that a textile fabric is rolled up, or is in a rolled-up state. This may be a felt having a length of from 20 to 70 m and a width of from 1.2 to 1.5 m, which is rolled up on a cardboard tube of approximately 10 cm in width.

In the case of non-woven carbon fiber fabrics, thicknesses of approximately 2 mm to 20 mm are available. The may be used for oven insulation or as porous electrodes in special battery systems. These applications can be produced using multi-stage temperature processes at from 600 to 3000° C. This high temperature is required in order to set specific properties such as high purity or low electrical resistance. The high-temperature treatment carried out at the end of the production process can occur intermittently in batch ovens, which should, however, be avoided as far as possible for cost reasons. The final temperature step therefore usually is effected continuously, the material usually being drawn through the system.

High-temperature treatment within the meaning of the invention means treating material at a temperature range of from 1800 to 3000° C.

Due to the acting tensile forces, the more process-relevant continuous method is limited to a minimum material strength. This renders manufacturing very thin materials, for example of less than 2 mm in thickness, very difficult in this process.

The finished carbon fiber non-woven fabric rolls are only assembled from a flat state. The strength of the materials results exclusively from the thickness of the raw material; subsequent assembling with a view to reducing the thickness is not possible.

A great disadvantage of this prior art is limitation with regard to the continuously workable material thicknesses. It is currently only possible to produce very thin felts in batch processes. This leads to limited flexibility, as the geometry of the raw material determines the end geometry with regard to thickness. In industrial production when rolled goods are used as half-finished products, assembling is only possible from a flat state.

SUMMARY OF THE INVENTION

It is accordingly an object of the invention to provide a method of producing thin carbon fiber non-wovens which overcomes the above-mentioned and other disadvantages of the heretofore-known devices and methods of this general type and which provides for a simple and cost-effective method for continuously producing thin carbon fiber non-woven fabrics on an industrial scale.

With the foregoing and other objects in view there is provided, in accordance with the invention, a method of producing a layer made of carbon fiber non-woven fabric, the method comprising:

providing a starting material being a carbon fiber non-woven fabric;

subjecting the starting material to a horizontal splitting process in a sample thickness, by moving the carbon fiber non-woven fabric relative to a blade construction and separating one layer or a plurality of layers consecutively from the carbon fiber non-woven fabric; and continuously removing the one layer or the plurality of layers from the carbon fiber non-woven fabric following the splitting process.

In other words, the objects of the invention are achieved by a method for producing a layer made of carbon fiber non-woven fabric: a carbon fiber non-woven fabric as the starting material is subjected to a horizontal splitting process in the sample thickness, the carbon fiber non-woven fabric is moved relative to a blade construction in order to separate a layer or a plurality of layers consecutively from the carbon fiber non-woven fabric. The one layer or the plurality of layers is or are continuously removed from the carbon fiber non-woven fabric after separating. It is thus possible to produce thin carbon fiber non-woven fabrics in industrial production in a cost-effective manner.

Horizontal splitting is used in working plastics material (flexible foams, see US 2012/0247290 A1 and DE 10 2010 004 205 A1, or rubber), in producing leather (split leather, see DE 44 12 432 A1 or DE 195 06 370 C2), and in producing and working non-woven fabrics and wool felt (see U.S. Pat. No. 5,057,173 and DE 38 35 007 A1). There is no splitting process used in the prior art for carbon fiber non-woven fabrics, also referred to as soft felts, and similar materials.

The specific properties of the original carbon fiber non-woven fabric (mechanical, thermal and electrical) remain unaffected to the greatest possible extent.

Sample thickness is the thickness of a sample. A synonym for sample is example. Thickness is the term, conforming to standards (DIN 6730), for the measurement between opposing surfaces. A carbon fiber non-woven fabric is a flat fabric. The sample thickness is thus the measurement between the two surfaces (in a horizontal position: upper side and lower side) of the flat fabric that is subject to the method according to the invention. Horizontal splitting therefore refers to splitting a flat fabric over the entire area thereof between the surfaces thereof, such that two flat fabrics are obtained, each of which is as large as the original flat fabric in terms of area.

Using the method according to the invention, a surprising number of thin, flexible soft felts made of carbon fibers can be cut out of a single thick textile half-finished product, which both sharply increases the process efficiency and makes continuous production of thin, high-temperature treated non-woven fabrics possible in the first place.

Preferably, the carbon fiber non-woven fabrics used are produced by needle-punching or by water jet entanglement. In the case of needle-punching, carded fibrous webs are mechanically hardened, metal needles pulling threads through the material by means of barbs. In the case of water jet entanglement, a powerful water jet is used, as opposed to needles.

It is preferable that the thickness of the carbon fiber non-woven fabric is 3-50 mm and the thickness of a separated layer is at least 0.2 mm. It is particularly advantageous that thin carbon fiber non-woven fabrics can be continuously produced and thick carbon fiber non-woven fabrics can be used as half-finished products. A thin carbon fiber non-woven fabric within the meaning of this invention is a separated layer having a thickness of from 0.2 mm to 2 mm, for example.

It is preferable that the carbon fiber non-woven fabric is based on viscose, polyacrylonitrile (PAN), pitch or lignin. Other non-woven fabrics are also possible. It is possible to include materials made of all currently available carbon fibers from various carbon sources. There is thus great flexibility with regard to the fibrous raw material.

Preferably, the blade construction consists of milling cutter-type cutting tools, band knives, double band knives having two adjacent single band knives, each of which is sharpened on one side, or rigid, ruler-type splitting knives having an oscillating drive. The blade of the blade construction according to the invention can be sharpened and automatically readjusted particularly preferably continuously or preferably at intervals, in order to keep the horizontal position constant. The swarf is sucked away in this case. Further vacuuming underneath the rollers ensures that the lower layer, including any material detached therefrom, is removed cleanly.

Preferably, separating and removing a layer or a plurality of layers occurs simultaneously and with constant tensile force. In this case, even thin layers of significantly less than 5 mm thickness can be controlled and reliably removed.

Tensile force is a force that pulls a mechanical body, i.e. acts on the force generator of the body. In the case of a system according to the invention, a mechanical winder can set a speed at the system, felt being removed from the system. The tensile force may be less than a kilonewton (kN) in this case. The two split felts (FIG. 1) are preferably removed with controlled identical force, which leads to a stable state of stress and consistent thicknesses.

A further aspect of the present invention is the layer, produced by the method according to the invention, made of carbon fiber non-woven fabric. As described at the outset, thin carbon fiber non-woven fabrics are produced in an original manner according to known methods, i.e. the corresponding non-woven fabric-forming machine yields the non-woven fabric in the desired thickness. As a result of the textile production process, the surface of these originally produced layers is not completely uniform and is uneven. However, the surface of the layer, produced according to the invention, made of carbon fiber non-woven fabric is significantly more uniform and even, due to exact splitting using a sharp band knife. A further distinguishing feature is that the cutting process results in an accumulation of terminal carbon fibers on the surface of the non-woven fabric layer. Thin carbon fiber non-woven fabrics that are split and produced in an original manner according to the invention are therefore only distinguishable from one another optically, i.e. by being viewed.

The one or more layers made of carbon fiber non-woven fabric, produced by the method according to the invention, are preferably used as electrode material for battery applications, high-temperature batteries, redox flow batteries or high-temperature insulating material. They can thus be used in a variety of ways. As energy storage technologies are currently under great price pressure, the economical method according to the invention is highly advantageous for renewable energies.

More preferably, the one or more layers made of carbon fiber non-woven fabric, produced by the method according to the invention, are used for gas diffusion layers (GDL) in fuel cells. Examples of used GDL materials are 3D non-woven fabric or 2D paper. As the method according to the invention can also be used in the case of these very thin materials, there is an even broader spectrum of technologies.

Other features which are considered as characteristic for the invention are set forth in the appended claims.

Although the invention is illustrated and described herein as embodied in a method of thin carbon fiber non-wovens, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE is a diagrammatic side view illustrating the method according to the invention.

DETAILED DESCRIPTION OF THE INVENTION

Referring now to the sole FIGURE of the drawing in detail there is shown how a carbon fiber non-woven fabric body 1 according to the invention, here a web of material, is split into two halves by a rotating band knife 4 and worked so as to form rolled goods by transport rollers 3. Following the split, the non-woven web 1 is separated into two equal-thickness layers, including a separated layer 2. It will be understood that an asymmetrical splitting process is technically possible in addition to the illustrated symmetrical splitting process. As continuous sharpening is possible, continuous working can occur, which leads to a constantly good cutting image.

Exemplary Embodiment

A 6 mm-thick carbon fiber felt based on viscose is split into two 3 mm-thick halves. The thickness of the split rolls is determined by the vertical positions of the feed rollers that convey the material through the machine. Identical settings for the upper and lower rollers are necessary for a symmetrical splitting result.

As the material must be slightly compressed in order to ensure transport, the split should be set to be somewhat smaller than half the original thickness. In the case of the carbon fiber felt, a compression of 10% is used, as there is no material damage at this value. The upper and lower offsets of the transport rollers are therefore 2.7 mm.

The feeding speed of the system is 8 m/min; the rotation speed of the band knife is 5 m/s. The band knife is continuously sharpened in order to ensure a clean cutting image.

The result is two rolls of split felt. The split surface is surprisingly good (optically smooth and uniform). A specific electrical resistance can be measured in the direction of thickness.

A sucking device over the entire felt width ensures that the split product is as free of dust and particles as possible.

The following measured property values (testing carbon materials) of the split carbon fiber felts were based on PAN or viscose:

Determining the ash content (solid matter)
Ash content following DIN 51903 (at 580° C.):
<0.05% (PAN-based);
<0.1% (viscose-based)
Determining the specific electrical resistance according to the current potential method (solid matter)
ER (x/y) following DIN 51911 (perpendicular to the felt plane):
<5 Ωmm (PAN-based);
<12 Ωmm (viscose-based)
Determining the specific electrical resistance according to the current potential method (solid matter)
ER (z) following DIN 51911 (in felt plane):
<2 Ωmm (PAN-based);
<4 Ωmm (viscose-based)
Thermal conductivity at room temperature according to the comparison method (solid matter)
TC according to DIN 51908 (perpendicular to the felt plane):
0.1-0.4 W/mK (PAN-based);
0.02-0.1 W/mK (viscose-based).

The invention claimed is:

1. A method of insulating a high temperature treatment zone, the method comprising:
   producing a layer made of carbon fiber non-woven fabric, the step of producing the layer including:
   providing a starting material being a carbon fiber non-woven fabric;
   subjecting the starting material to a horizontal splitting process in a sample thickness, by moving the carbon fiber non-woven fabric relative to a blade construction and separating one layer or a plurality of layers consecutively from the carbon fiber non-woven fabric; and
   continuously removing the one layer or the plurality of layers from the carbon fiber non-woven fabric following the splitting process; and
   insulating the high temperature treatment zone with the one layer or the plurality of layers forming a high-temperature insulating material.

2. The method according to claim 1, wherein a thickness of the carbon fiber non-woven fabric to be split is 3 mm to 50 mm.

3. The method according to claim 1, wherein a thickness of a separated layer is at least 0.2 mm.

4. The method according to claim 1, wherein said carbon fiber non-woven fabric is based on a material selected from the group consisting of viscose, PAN, pitch and lignin.

5. The method according to claim 1, wherein the blade construction is selected from the group consisting of milling cutter cutting tools, band knives, double band knives having two adjacent single band knives, each of which is sharpened on one side, and rigid, ruler-shaped splitting knives having an oscillating drive.

6. The method according to claim 1, which comprises separating and removing the one or more layers simultaneously and with constant tensile force.

* * * * *